United States Patent
Schnaufer et al.

(10) Patent No.: US 9,873,464 B2
(45) Date of Patent: Jan. 23, 2018

(54) VEHICLE BODY HAVING TWO ADHESIVELY BONDED BODY COMPONENTS

(71) Applicant: Bayerische Motoren Werke Aktiengesellschaft, Munich (DE)

(72) Inventors: Thomas Schnaufer, Oberhausen (DE); Andreas Beil, Munich (DE); Juergen Lenz, Fahrenzhausen (DE); Lorenz Schmid, Wessling (DE); Martin Eis, Karlsfeld (DE); Torsten Fleischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 14/995,725

(22) Filed: Jan. 14, 2016

(65) Prior Publication Data

US 2016/0129948 A1   May 12, 2016

Related U.S. Application Data

(63) Continuation of application No. PCT/EP2014/065083, filed on Jul. 15, 2014.

(30) Foreign Application Priority Data

Jul. 29, 2013   (DE) .................. 10 2013 214 782

(51) Int. Cl.
*B62D 27/02* (2006.01)
*B62D 25/02* (2006.01)
(Continued)

(52) U.S. Cl.
CPC .......... *B62D 27/026* (2013.01); *B62D 25/02* (2013.01); *B62D 25/025* (2013.01); *B62D 25/04* (2013.01); *B62D 29/043* (2013.01)

(58) Field of Classification Search
CPC ...... B62D 27/026; B62D 25/02; B62D 25/04; B62D 25/025
(Continued)

(56) References Cited

U.S. PATENT DOCUMENTS 4,863,771 A    9/1989  Freeman
6,296,301 B1 * 10/2001 Schroeder ............ B62D 29/046
                                                    296/187.02

(Continued)

FOREIGN PATENT DOCUMENTS

CN    103140411 A    6/2013
DE    36 32 012 A1   3/1987
(Continued)

OTHER PUBLICATIONS

International Search Report (PCT/ISA/210) issued in PCT Application No. PCT/EP2014/065083 dated Nov. 24, 2014 with English translation (seven pages).

(Continued)

*Primary Examiner* — Jason S Morrow
(74) *Attorney, Agent, or Firm* — Crowell & Moring LLP

(57) ABSTRACT

A vehicle body includes a first body component made of fiber-reinforced plastic and a second body component made of fiber-reinforced plastic. The body components are adhesively bonded to each other by an adhesive layer and are subjected to shearing load and/or tensile stress in a main stress plane, wherein the adhesive layer is shaped by way of an adhesive flange, on which the adhesive layer is oriented obliquely to the main loading plane at an angle between 30° and 60°.

13 Claims, 5 Drawing Sheets

(51) Int. Cl.
  *B62D 29/04* (2006.01)
  *B62D 25/04* (2006.01)
(58) Field of Classification Search
  USPC .................. 296/193.04, 193.05, 193.06, 29
  See application file for complete search history.

(56) References Cited

U.S. PATENT DOCUMENTS

| | | | |
|---|---|---|---|
| 6,543,839 | B1 | 4/2003 | Gfrerrer et al. |
| 9,132,859 | B2 * | 9/2015 | Yamaji ................. B62D 25/00 |
| 2004/0070233 | A1 | 4/2004 | Steinhauser et al. |
| 2011/0057476 | A1 | 3/2011 | Beck et al. |
| 2013/0200657 | A1 | 8/2013 | Shirai |
| 2013/0313862 | A1 * | 11/2013 | Yamaji ................. B62D 25/025 296/203.01 |
| 2013/0313863 | A1 * | 11/2013 | Yamaji ................. B62D 25/00 296/203.01 |
| 2015/0048654 | A1 | 2/2015 | Eipper et al. |
| 2016/0129948 | A1 * | 5/2016 | Schnaufer ............. B62D 25/02 296/203.01 |
| 2016/0356334 | A1 * | 12/2016 | Onoue ................. B62D 29/04 |

FOREIGN PATENT DOCUMENTS

| | | |
|---|---|---|
| DE | 198 09 750 A1 | 9/1999 |
| DE | 102 29 401 A1 | 1/2004 |
| DE | 10 2011 003 626 A1 | 8/2012 |
| EP | 1 557 342 A2 | 7/2005 |
| EP | 2 457 808 A1 | 5/2012 |
| EP | 2 535 242 A1 | 12/2012 |
| JP | 2002-274425 A | 9/2002 |
| JP | 2011-195107 A | 10/2011 |
| WO | WO 2010/003524 A1 | 1/2010 |
| WO | WO 2013/029695 A1 | 3/2013 |
| WO | WO 2013/083218 A1 | 6/2013 |

OTHER PUBLICATIONS

German Search Report issued in counterpart German Application No. 10 2013 214 782.1 dated Dec. 20, 2013 with partial English translation (10 pages).
Chinese Office Action issued in counterpart Chinese Application No. 201480031393.0 dated Sep. 2, 2016 with English translation (14 pages).

* cited by examiner

VEHICLE BODY HAVING TWO ADHESIVELY BONDED BODY COMPONENTS

CROSS REFERENCE TO RELATED APPLICATIONS

This application is a continuation of PCT International Application No. PCT/EP2014/065083, filed Jul. 15, 2014, which claims priority under 35 U.S.C. § 119 from German Patent Application No. 10 2013 214 782.1, filed Jul. 29, 2013, the entire disclosures of which are herein expressly incorporated by reference.

BACKGROUND AND SUMMARY OF THE INVENTION

The invention relates to a vehicle body having a first body component of fiber-reinforced plastic, and a second body component of fiber-reinforced plastic, which are adhesively bonded to one another by way of an adhesive layer and are subjected to shear stress and/or tensile stress in a main stress plane.

In vehicle bodies of modern vehicles, the body components are designed from fiber-reinforced plastic. Such body components are comparatively thin-walled and, correspondingly, have low rigidity and stability. It is correspondingly problematic for such body components to be connected so as to form a vehicle body which is stable or rigid, respectively, on the one hand, yet selectively resilient, on the other hand. It is known in principle here for the body components to be interconnected on adhesive faces by use of adhesive layers.

According to the invention, a vehicle body has a first body component of fiber-reinforced plastic, and a second body component of fiber-reinforced plastic, which are adhesively bonded to one another by way of an adhesive layer and, in a main stress plane, are shear-stressed and/or tensile-stressed. The adhesive layer is shaped by way of an adhesive flange. On the adhesive flange, the adhesive layer is obliquely oriented to the main stress plane at an angle between 30° and 60°. Particularly preferably, the adhesive layer according to the invention is obliquely oriented to the main stress plane at an angle between 40° and 50°, in particular at an angle of 45°.

Using the adhesive layer designed according to the invention, which on an associated adhesive flange is placed obliquely to the main stress plane in a targeted manner, joining in a shearing manner is avoided at the connection point of the two interconnected body components. At the same time, tensile head loads are also avoided, stress instead being introduced into the adhesive layer purely by shearing. Such an adhesive connection has a long life span and also high strength. The adhesive connection may also assume a sealing function. To this end it is particularly advantageous for the adhesive connection according to the invention to be designed as a structured adhesive connection, that is to say as an adhesive connection having a specially structured design of the adhesive faces, so as to include a sealing function. According to the invention, no second connection technique, such as screwing or riveting, and also no additional sealing process, is correspondingly required.

The body components according to the invention are preferably designed using plastics as a matrix, to which end both duroplastic as well as thermoplastic polymers may be employed. The comparatively cost-effective polyester resins, vinyl ester resins, and epoxy resins are used as duroplastic matrix systems. Thermoplastic fiber-composite materials may also be manufactured. In this case, mainly polyamides, polypropylenes, and polyethylenes are employed as matrix systems. Reinforcement materials or reinforcement fibers, respectively, are embedded in plastics of this type. According to the invention, mainly synthetic fibers from glass, carbon, and aramid, which are used as rovings, cross-laid structures, fabrics, or non-wovens, are used as a reinforcement material. In this way, the properties of the particularly shell-shaped body components may be varied in a wide range, both in an absolute manner as well as in a relative manner between the longitudinal and transverse direction of the body components.

As an adhesive method, according to the invention, an activator is preferably applied onto the body components prior to joining. The activator greatly accelerates the chemical reaction of the associated adhesive on the contact faces with the body components. Furthermore, adhesive is applied only to one body component, while the other body component is intensively heated. During subsequent joining of the body components a transition temperature, which is significantly above room temperature, is established. This temperature, in collaboration with the activator, leads to a very rapid reaction of the adhesive on the contact faces, such that the adhesive on the contact faces after a few seconds of holding time at this transition temperature builds up sufficient strength to prevent air from entering into the adhesive during subsequent increase of the temperature for curing the adhesive.

An A-pillar of a passenger cabin is preferably designed using the first and second body components of this type according to the invention. Such an A-pillar in terms of the main loading plane thereof, during normal operation of the vehicle, is stressed in the vertical direction and, in the event of a side impact, is stressed in the horizontal direction. The A-pillar thus has two main stress planes, one vertical stress plane and one horizontal stress plane.

Furthermore, on the vehicle body according to the invention, a side frame of a passenger cabin is advantageously designed using the first body component, and an annular-frame lower part of the passenger cabin is advantageously designed using the second body component. In the case of these two body components, again a vertical stress plane for the usual supporting stress and a horizontal stress plane for a side impact result as main stress planes.

According to the invention, furthermore, a third body component is preferably provided on the vehicle body, the adhesive layer of the third body component in relation to the first or second body component superimposing the adhesive layer between the first and the second body component. By way of this adhesive-layer arrangement, two adhesive layers are thus located on top of one another in a superimposing manner, a body component being located between the adhesive layers. The further two body components bear on the two outer sides of these adhesive layers. The body components here may only partially superimpose one another in the manner of roof tiles. Nevertheless, a "central" adhesive region, which acts as a connection hub for the body components, is established. Using the adhesive layers designed according to the invention, great rigidity can be achieved and, at the same time, particularly advantageous balancing of tensions during thermal expansion of the participating body components is enabled at this connection hub.

According to the invention, a side frame of a passenger cabin is preferably designed using the first and second body components, and a bulkhead or front end wall of the passenger cabin is preferably designed using the third body component. The side frame and the bulkhead are thus advantageously linked at this connection hub.

The invention is furthermore directed toward a vehicle body, in particular of the abovementioned type, having a first body component of fiber-reinforced plastic, and a second body component of fiber-reinforced plastic, which are adhesively bonded to one another by an adhesive layer and, in a main stress plane, are shear-stressed and/or tensile-stressed, wherein the adhesive layer is shaped by way of a curved adhesive flange. The adhesive layer of this type is selectively domed or is configured into a dome of the participating body components, respectively. Joining in a shearing manner and tensile head loads may also be avoided and introduction of load by shearing may be achieved using the design embodiment of this type. Furthermore, such an adhesive bond is advantageous in terms of an envisaged sealing function.

Attachment of a sill of a passenger cabin to a side frame is advantageously designed using the adhesive flange construction of this type, wherein a sill reinforcement of a passenger cabin is designed using the first body component, and a side frame of the passenger cabin is designed using the second body component.

Finally, the invention is also directed toward a vehicle body, in particular of the abovementioned type, having a first body component of fiber-reinforced plastic, and a second body component of fiber-reinforced plastic, which are adhesively bonded to one another by an adhesive layer, wherein the adhesive layer is particularly selectively designed to have a thickness of 1.4 mm to 1.6 mm. By way of an adhesive layer of this type, in particular in combination with the adhesive method explained above, a particularly advantageous balancing of tolerances of the participating body components within the adhesive layer is enabled. Furthermore, no second connection technique, such as screwing or riveting, and no additional sealing process, is required in this case.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
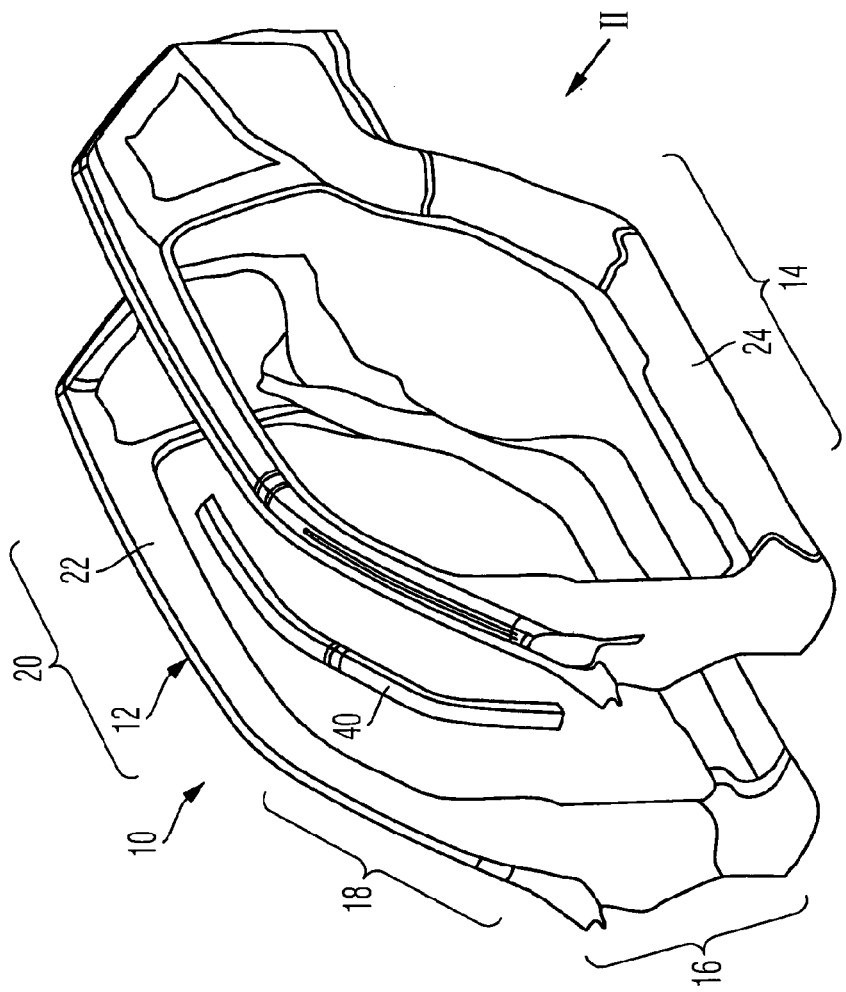
FIG. 1 is a perspective exploded illustration of part of a vehicle body according to an embodiment of the invention.
Figure 2:
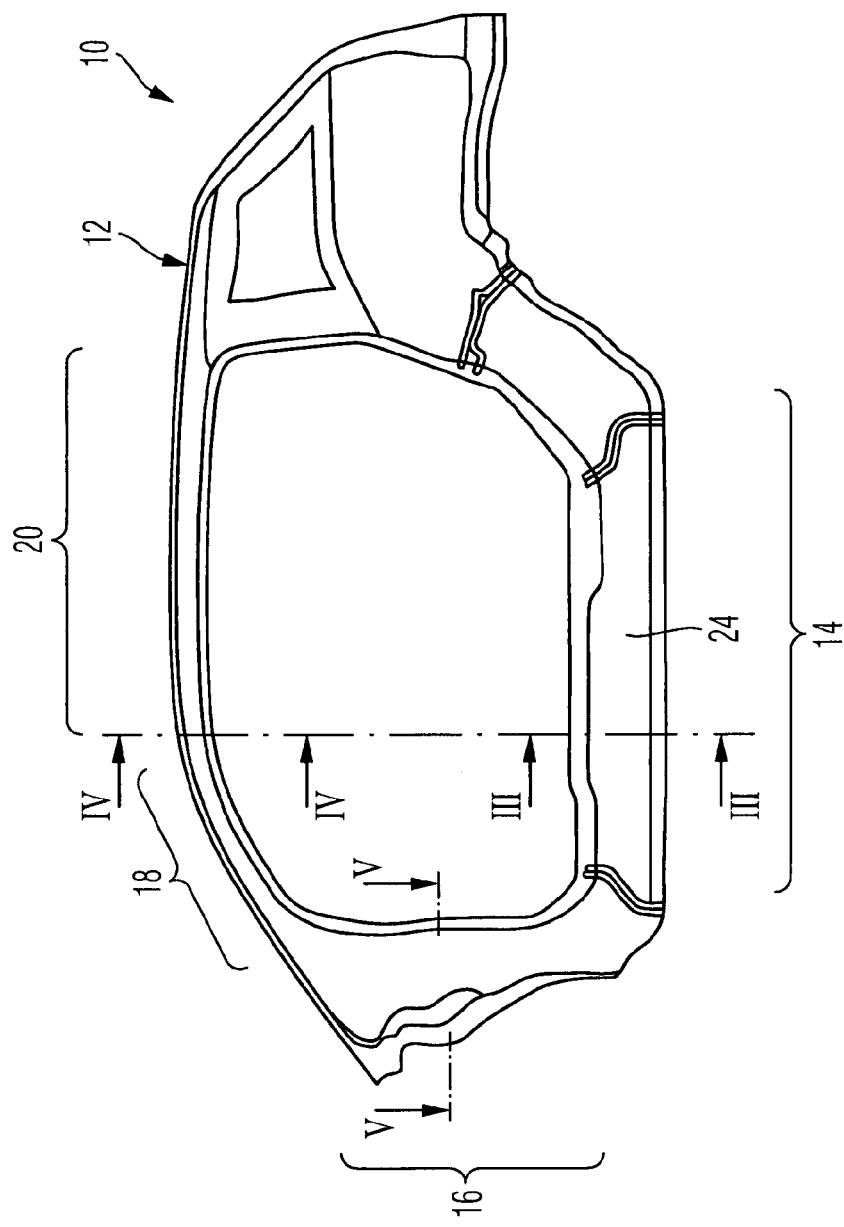
FIG. 2 is a side view in a direction of arrow II according to FIG. 1.

A vehicle body 10 of a passenger motor vehicle has a side wall or a side frame 12, respectively, as a substantial part of the passenger cabin of the passenger motor vehicle. The side frame 12 laterally on the vehicle body 10 forms an annular shape by way of which vehicle passengers inside the passenger cabin are particularly protected in the event of frontal impact as well as side impact to the vehicle body 10. The side frame 12, in terms of the associated vehicle, includes a lower sill or a sill region 14, respectively, a front bulkhead or a bulkhead region 16, respectively, a front A-pillar or an A-pillar region 18, and an upper roof rail or a roof-rail region 20, respectively, as body components.

The side frame 12 is formed by an inside side-frame shell 22 and an outside side-frame shell 24, which are in each case manufactured as thin-walled body components in a structured shell shape from fiber-reinforced plastics.

The two side-frame shells 22 and 24 are adhesively bonded to one another on strip-shaped adhesive flanges 26 which, in particular, run along peripheries of the side-frame shells 22 and 24 and are likewise thin-walled. It is depicted in FIGS. 3, 4 and 5 that these adhesive flanges 26 have, in each case, an adhesive layer 28 having a thickness of 1.5 mm, with a thickness tolerance of ±0.1 mm, between the two body components which are adhesively bonded there.

Furthermore, in relation to a horizontal main stress plane 30 as well as to a vertical main stress plane 32 of the respective adhesive point, these adhesive flanges 26 are obliquely arranged at an angle of approx. 45°.

Figure 3:
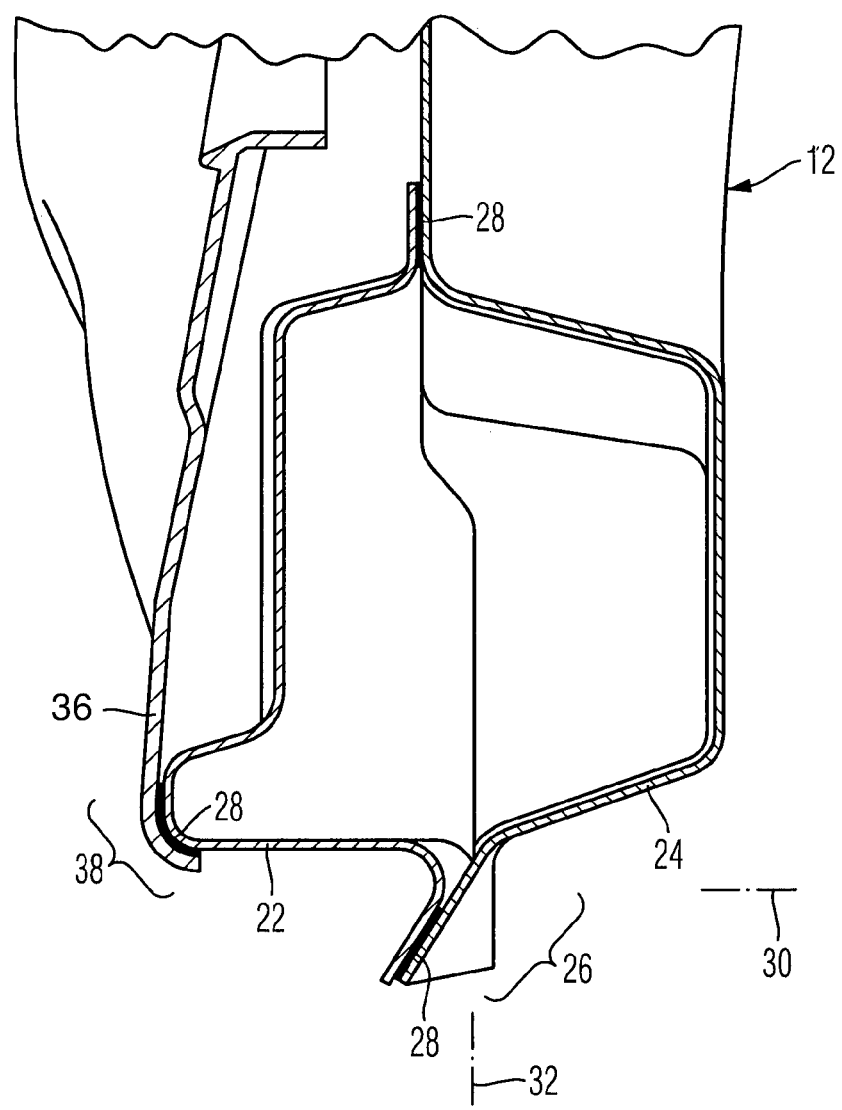
FIG. 3 is a cross section view taken along line III-III in FIG. 2.

It is further depicted in FIG. 3 that a likewise shell-shaped sill reinforcement 36 made of fiber-reinforced plastic, which is adhesively bonded by way of a curved adhesive flange 38 and an adhesive layer 28 (which is disposed in the curve of said adhesive flange 38 and likewise has a thickness of 1.5±0.1 mm), is provided on the inner side of the inside side-frame shell 22, at the lower sill region 14 thereof.

Figure 4:
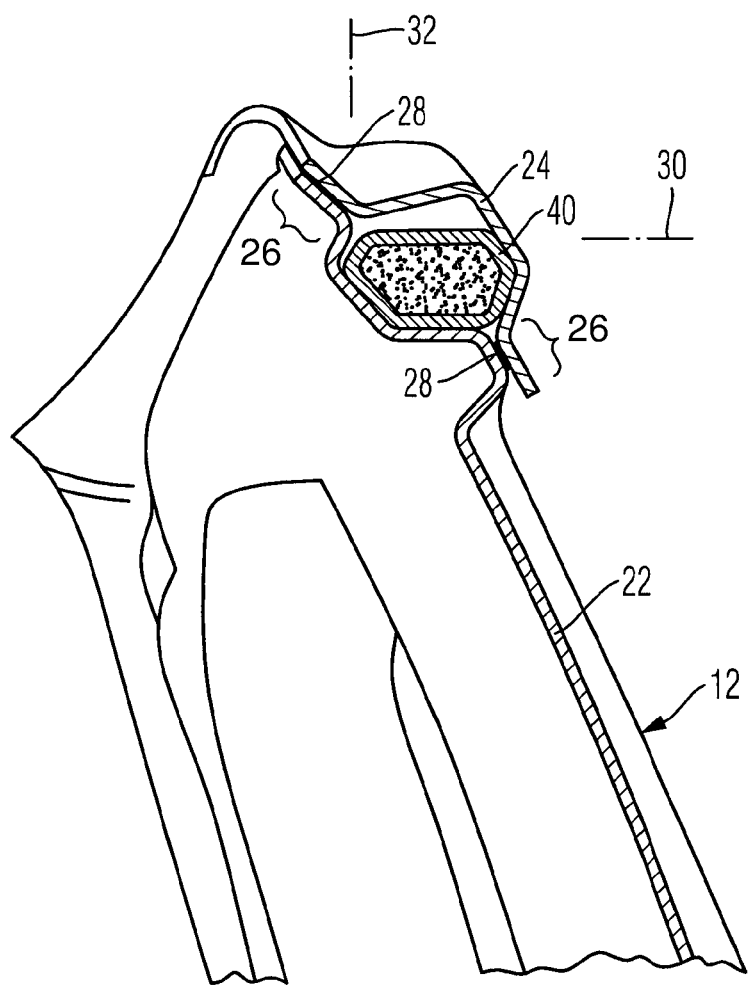
FIG. 4 is a cross section view taken along line IV-IV in FIG. 2.
Figure 5:
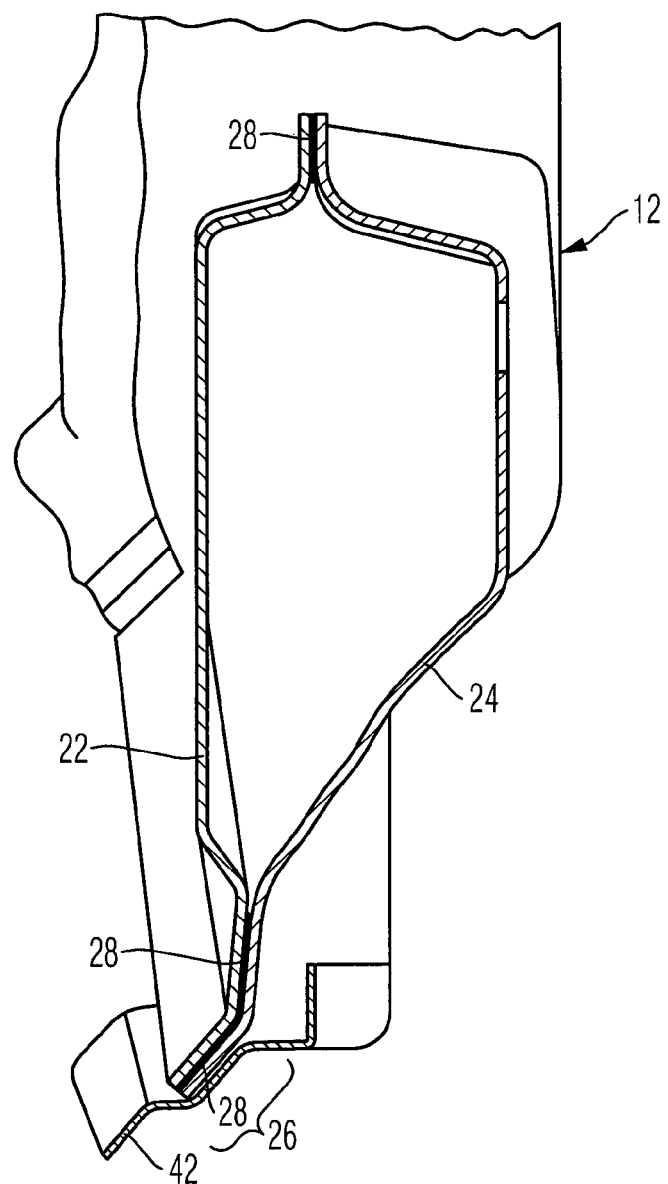
FIG. 5 is a cross section view taken alone line V-V in FIG. 2.

By way of FIG. 4 it is furthermore depicted how a rod-shaped A-pillar reinforcement 40, which is likewise made from fiber-reinforced plastic is held in the A-pillar region 18 between the adhesive flanges 26 in the interior of the two side-frame shells 22 and 24 are obliquely placed to the main stress planes 30 and 32.

Finally, it may be seen in FIG. 5, in the left region thereof, how a bulkhead shell 42, which in the associated vehicle extends substantially in the transverse direction of the latter as a lower front bulkhead or end wall of the passenger cabin, respectively, on the lateral peripheral region thereof is adhesively bonded to the side frame 12 which is formed from the inside side-frame shell 22 and the outside side-frame shell 24 by means of a likewise obliquely placed adhesive layer 28. The adhesive layer 28 for the bulkhead shell 42 here is at least partly superimposed over the adhesive layer 28, as is also the case with roof tiles. In this way, a connection hub of the associated bulkhead to the side frame 12, which is constructed from adhesive layers 28 which are layered on top of one another, is achieved.

LIST OF REFERENCE SIGNS

10 Vehicle body
12 Side frame
14 Sill region
16 Bulkhead region
18 A-pillar region
20 Roof-rail region
22 Inside side-frame shell
24 Outside side-frame shell
26 Obliquely oriented adhesive flange
28 Adhesive layer
30 Horizontal main stress plane
32 Vertical main stress plane
36 Sill reinforcement
38 Curved adhesive flange
40 A-pillar reinforcement
42 Bulkhead shell The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body, comprising:
a first body component of fiber-reinforced plastic;
a second body component of fiber-reinforced plastic;
an adhesive layer bonding the first and second body components to one another; and
a third body component, wherein
the first and second body components are subjected to shear stress and/or tensile stress in a main stress plane,
the adhesive layer is shaped via an adhesive flange, on which adhesive flange the adhesive layer is oriented obliquely relative to the main stress plane at an angle of between 30° and 60°, and
an adhesive layer of the third body component in relation to the first or second body components is arranged to superimpose on the adhesive layer between the first and second body components.

2. The vehicle body according to claim 1, wherein the adhesive layer is oriented obliquely relative to the main stress plane at an angle of between 40° and 50°.

3. The vehicle body according to claim 1, wherein the adhesive layer is oriented obliquely relative to the main stress plane at an angle of approximately 45°.

4. The vehicle body according to claim 1, wherein the first and second body components form an A-pillar of a passenger cabin.

5. The vehicle body according to claim 1, wherein
the first body component forms a side frame of a passenger cabin, and
the second body component forms an annular frame lower part of the passenger cabin.

6. The vehicle body according to claim 1, wherein the third body component is formed of fiber-reinforced plastic.

7. The vehicle body according to claim 1, wherein
the first and second body components form a side frame of a passenger cabin, and
the third body component forms a bulkhead of the passenger cabin.

8. The vehicle body according to claim 6, wherein
the first and second body components form a side frame of a passenger cabin, and
the third body component forms a bulkhead of the passenger cabin.

9. A vehicle body, comprising:
a first body component of fiber-reinforced plastic;
a second body component of fiber-reinforced plastic;
an adhesive layer bonding the first and second body components to one another; and
another adhesive layer adhesively bonding the first and second body components to one another, wherein
the first and second body components are subjected to shear stress and/or tensile stress in a main stress plane,
the adhesive layer is shaped via an adhesive flange, on which adhesive flange the adhesive layer is oriented obliquely relative to the main stress plane at an angle of between 30° and 60°, and
the another adhesive layer is shaped by a curved adhesive flange.

10. A vehicle body, comprising:
a first body component formed of fiber-reinforced plastic;
a second body component formed of fiber-reinforced plastic;
an adhesive layer configured to adhesively bond the first and second body components to one another, the first and second body components being subjected to shear stress and/or tensile stress in a main stress plane; and
a third body component, wherein
the adhesive layer is shaped by a curved adhesive flange, and
the third body component is adhesively bonded to at least one of the first and second body components via a further adhesive layer,
the further adhesive layer being shaped by an adhesive flange, on which adhesive flange the further adhesive layer is oriented obliquely relative to the main stress plane at an angle between 30° and 60°.

11. The vehicle body according to claim 9, wherein
the first body component forms a sill reinforcement of a passenger cabin, and
the second body component forms a side frame of the passenger cabin.

12. A vehicle body, comprising:
a first body component of fiber-reinforced plastic;
a second body component of fiber-reinforced plastic; and
an adhesive layer bonding the first and second body components to one another, wherein
the first and second body components are subjected to shear stress and/or tensile stress in a main stress plane,
the adhesive layer is shaped via an adhesive flange, on which adhesive flange the adhesive layer is oriented obliquely relative to the main stress plane at an angle of between 30° and 60°, and
the adhesive layer has a thickness of 1.4 mm to 1.6 mm.

13. A vehicle body, comprising:
a first body component formed of fiber-reinforced plastic;
a second body component formed of fiber-reinforced plastic; and
an adhesive layer configured to adhesively bond the first and second body components to one another, the first and second body components being subjected to shear stress and/or tensile stress in a main stress plane, wherein
the adhesive layer is shaped by a curved adhesive flange, and
the adhesive layer has a thickness of 1.4 mm to 1.6 mm.

* * * * *